(12) United States Patent
Oh et al.

(10) Patent No.: US 10,562,515 B2
(45) Date of Patent: Feb. 18, 2020

(54) METHOD FOR DETERMINING OPTIMAL OPERATING POINT FOR HYBRID ELECTRIC VEHICLE

(71) Applicants: HYUNDAI MOTOR COMPANY, Seoul (KR); KIA MOTORS CORPORATION, Seoul (KR)

(72) Inventors: Ji Won Oh, Hwaseong-si (KR); Jeong Soo Eo, Hwaseong-si (KR); Sung Jae Kim, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 181 days.

(21) Appl. No.: 15/609,913

(22) Filed: May 31, 2017

(65) Prior Publication Data
US 2018/0134273 A1    May 17, 2018

(30) Foreign Application Priority Data
Nov. 16, 2016    (KR) .................. 10-2016-0152373

(51) Int. Cl.
*B60W 20/11*    (2016.01)
*B60K 6/48*    (2007.10)

(52) U.S. Cl.
CPC ............. *B60W 20/11* (2016.01); *B60K 6/48* (2013.01)

(58) Field of Classification Search
None
See application file for complete search history.

(56) References Cited

U.S. PATENT DOCUMENTS

| | | | |
|---|---|---|---|
| 2012/0208672 A1* | 8/2012 | Sujan ................ | B60W 10/02 477/5 |
| 2015/0283996 A1* | 10/2015 | Wang ................ | B60K 6/547 477/3 |
| 2015/0298570 A1* | 10/2015 | Hisano ............... | B60L 11/1861 701/22 |
| 2016/0121875 A1* | 5/2016 | Aikawa .............. | B60W 10/08 701/22 |
| 2016/0257298 A1* | 9/2016 | Kim .................. | B60W 10/08 |

OTHER PUBLICATIONS

Khajepour et al., "Electric and Hybrid Vehicles: Technologies, Modeling and Control—a Mechatronic Approach", John Wiley & Sons, Inc., 2014, p. 314-315 (Year: 2014).*

* cited by examiner

*Primary Examiner* — Tamara L Weber
(74) *Attorney, Agent, or Firm* — Brinks Gilson & Lione

(57) ABSTRACT

The present disclosure provides a method of determining an optimal operating point of a hybrid electric vehicle. The method includes: determining demand torque, comparing the demand torque and an engine torque reference value obtained from an optimal operating line to determine a determined mode where the determined mode is a charging mode or a discharging mode, determining a plurality of candidate points comprising a combination of an engine operating point satisfying the demand torque and a motor operating point corresponding to the engine operating point in the determined mode, calculating system efficiency during charging using charging efficiency of each candidate point of the plurality of candidate points and discharging efficiency during previous driving when the determined mode is a charging mode, and determining a candidate point with highest system efficiency during charging as an optimal operating point.

9 Claims, 1 Drawing Sheet

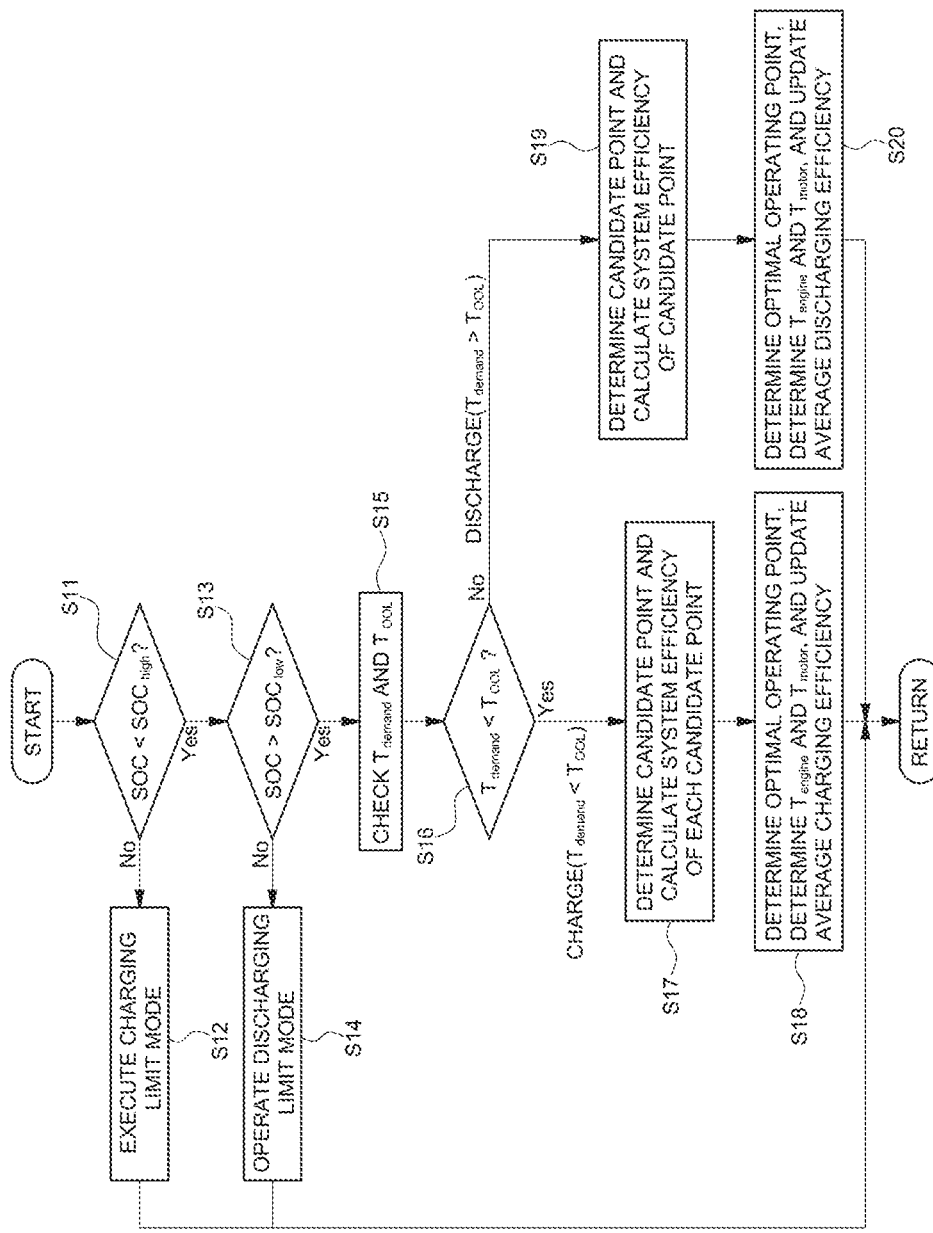

METHOD FOR DETERMINING OPTIMAL OPERATING POINT FOR HYBRID ELECTRIC VEHICLE

CROSS-REFERENCE TO RELATED APPLICATION

The present application claims priority to and the benefit of Korean Patent Application No. 10-2016-0152373, filed on Nov. 16, 2016, which is incorporated herein by reference in its entirety.

FIELD

The present disclosure relates to a method of determining an optimal operating point of a hybrid electric vehicle. More particularly, it relates to a method of determining an optimal operating point of an engine and a motor based on system efficiency in a hybrid electric vehicle for obtaining driving force using the engine and the motor.

BACKGROUND

The statements in this section merely provide background information related to the present disclosure and may not constitute prior art.

In general, unlike a conventional internal combustion engine vehicle (general engine vehicle), a parallel-type hybrid electric vehicle (HEV) satisfies driver's acceleration demand via power distribution of an engine and a motor.

The hybrid electric vehicle is operated to follow an optimal operating line (OOL) to achieve maximum efficiency in order to enhance system efficiency. When driver demand torque is higher than engine torque of the OOL, a difference therebetween is compensated for by motor output (motor driving torque) and when driver demand torque is lower than engine torque of the OOL, a battery is recharged with counter torque (motor regenerative torque) of a motor.

In this case, the demand torque is determined based on vehicle driving information, state information, environment variables, and so on, which are collected from a vehicle by a controller. Then, an operating point with highest system efficiency is determined as an optimal operating point among operating point candidates that satisfy demand torque, and engine operation is controlled according to the optimal operating point.

When demand torque is higher than engine torque according to an OOL, a difference therebetween is compensated for by a motor output to satisfy the demand torque (discharge), whereas, when demand torque is lower than engine torque, a motor is operated as an electric generator by extra output generated by an engine to recharge a battery (charge).

Such a method is a strategy for enhancing engine efficiency with remarkable efficiency change according to an operating point compared with a motor.

As such, when a combination of optimal operating points of an engine and a motor is selected based on system efficiency, an operating point for achieving optimal system efficiency is selected based on engine efficiency and charging efficiency of a motor/battery during charging.

Similarly, an operating point for achieving optimal system efficiency is also selected based on engine efficiency and discharging efficiency of motor/battery during discharging.

This method is a method for achieving optimal system efficiency by considering only charging efficiency for charging and only discharging efficiency for discharging.

However, extra output generated by an engine is not output that is actually transmitted to a power system to generate kinetic energy when only actual charging efficiency is considered but is reconverted into kinetic energy in consideration of both charging efficiency and discharging efficiency.

Similarly, battery output converted into kinetic energy in a motor via discharging of the battery may accurately reflect overall system efficiency in consideration of charging efficiency when the output is first stored in the battery in addition to the consideration of discharging efficiency only.

SUMMARY

In one aspect, the present disclosure provides a method of determining an optimal operating point of a hybrid electric vehicle, for improving a method of determining system efficiency in a hybrid electric vehicle that obtains driving force using an engine and a motor so as to enhance vehicle fuel efficiency, to reduce a battery usage amount, and to enhance a battery lifetime.

In one form of the present disclosure, a method of determining an optimal operating point of a hybrid electric vehicle includes: determining demand torque, comparing the demand torque and an engine torque reference value obtained from an optimal operating line to determine a determined mode where the determined mode is a charging mode or a discharging mode, determining a plurality of candidate points comprising a combination of an engine operating point satisfying the demand torque and a motor operating point corresponding to the engine operating point in the determined mode, calculating system efficiency during charging using charging efficiency of each candidate point of the plurality of candidate points and discharging efficiency during previous driving when the determined mode is a charging mode, and determining a candidate point with highest system efficiency during charging as an optimal operating point.

In another form of the present disclosure, a method of determining an optimal operating point of a hybrid electric vehicle includes: determining demand torque, comparing the demand torque and an engine torque reference value obtained from an optimal operating line to determine a determined mode where the determined mode is a charging mode or a discharging mode, determining a plurality of candidate points comprising a combination of an engine operating point satisfying the demand torque and a motor operating point corresponding to the engine operating point in the determined mode, calculating system efficiency during discharging using discharging efficiency of each candidate point of the plurality of candidate points and charging efficiency during previous driving when the determined mode is a discharging mode, and determining a candidate point with highest system efficiency during discharging as an optimal operating point.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a flowchart of an operation of determining an optimal operating point.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a method of determining an optimal operating point of a hybrid electric vehicle, for improving a method of determining system efficiency in a parallel-type hybrid electric vehicle that obtains driving force using an engine and a motor to enhance vehicle efficiency, to reduce a battery use amount, and to enhance a battery lifetime.

To this end, in the method of determining an optimal operating point according to one form of the present disclosure, the optimal operating point of an engine and a motor may be determined in consideration of both charging efficiency and discharging efficiency of a system.

In general, in order to select an optimal operating point in a hybrid electric vehicle, a controller in a vehicle collects vehicle driving information from an acceleration pedal sensor (APS), a brake pedal sensor (BPS), and so on, vehicle state information such as a gear stage, vehicle speed, engine velocity (rpm), a battery state of charge (SOC), and so on, and environment variables such as a road in real time and determines demand torque based on the collected information.

Operating point candidates (hereinafter, referred to as 'candidate points') that satisfy the determined demand torque may be determined, system efficiency of each candidate point may be determined and, then, an operating point with highest system efficiency may be determined as an optimal operating point among the candidate points.

Here, the candidate points contain a combination of engine torque and motor torque (regenerative torque during charging and driving torque during discharging) and when the optimal operating point is determined as described above, operations of an engine and a motor may be controlled according to the engine torque and the motor torque of the corresponding combination.

When engine torque (engine torque reference value) that follows an optimal operating line is greater than demand torque, counter torque (motor regenerative torque) may be applied to a motor by extra engine output to recharge a battery with power generated by the motor operating as an electric generator (charge).

On the other hand, when demand torque is greater than engine torque, a difference therebetween may be compensated for by motor torque (motor driving torque) to satisfy the demand torque (discharge).

In the present disclosure, an operation of determining demand torque and an operation of determining a candidate point are well known technologies and, thus, a detailed description thereof will be omitted herein.

As described above, in order to determine the optimal operating point, system efficiency may be calculated using information items corresponding to respective candidate points and, then, an operating point (optimal operating point) with highest system efficiency needs to be selected.

Accordingly, the operation of determining the optimal operating point of the hybrid electric vehicle may include an operation of calculating system efficiency using information of motor output (which is acquired from motor torque) and engine output (which is acquired from engine torque) in demand torque and candidate point, charging efficiency and discharging efficiency of current motor/battery, engine efficiency information, and so on.

Conventionally, with regard to calculation of system efficiency, the system efficiency is calculated using only charging efficiency during charging or only using discharging efficiency during discharging.

However, according to the present disclosure, system efficiency may be calculated using both charging efficiency and discharging efficiency during charging and discharging.

In detail, system efficiency (system efficiency during charging) may be calculated using previous average charging efficiency (average charging efficiency) and current discharging efficiency and, then, a candidate point with highest system efficiency may be determined as an optimal operating point among the candidate points during discharging. Similarly, system efficiency (system efficiency during discharging) may also be calculated using previous average discharging efficiency (average discharging efficiency) and current charging efficiency and, then, a candidate point with highest system efficiency may be determined as an optimal operating point during charging.

Unlike conventional systems and methods where only current charging efficiency is used during charging and only discharging efficiency is used during discharging, the present disclosure additionally utilizes an average of charging efficiency during previous driving and an average of discharging efficiency.

Here, determination of an operating point refers to determination of both an engine operating point and a motor operating point. Each candidate point contains a combination of the engine operating point and the motor operating point, and an optimal operating point acquired based on system efficiency includes a combination of an optimal engine operating point and an optimal motor operating point.

The average charging efficiency and the average discharging efficiency may replace predicted charging efficiency and predicted discharging efficiency during subsequent driving and, thus, according to the present disclosure, average efficiency during driving for a recent predetermined time from a previous time may be used instead of a predicted value during subsequent driving.

The average charging efficiency and the average discharging efficiency may be charging efficiency and discharging efficiency in which characteristics of a driver are reflected.

In another form of the present disclosure, the average charging efficiency may be an average of efficiencies during charging for a recent predetermined time (a moving average value is applied), and the average discharging efficiency may also be an average of efficiencies during discharging for a recent predetermined time.

According to Equations 1 and 2 below, system efficiency during charging and system efficiency during discharging which satisfy demand torque may be calculated.

$$\eta_{sys,chg} = \frac{\dot{W}_{eng} + \dot{W}_{mot} - \dot{W}_{mot}\eta_{chg}\eta_{av,dch}}{\dot{W}_{eng}}\eta_{eng} \qquad \text{[Equation 1]}$$

$$\eta_{sys,dch} = \frac{\dot{W}_{eng} + \dot{W}_{mot}}{\dot{W}_{eng} + \frac{\dot{W}_{mot}}{\eta_{av,chg}\eta_{dch}}}\eta_{eng} \qquad \text{[Equation 2]}$$

Here, each symbol in the above equations may be defined as follows.

$\eta_{sys,chg}$: System efficiency during charging
$\eta_{sys,dch}$: System efficiency during discharging
$\dot{W}_{eng}$: Engine output
$\dot{W}_{mot}$: Motor output
$\eta_{chg}$: Current charging efficiency $\eta_{dch}$: Current discharging efficiency $\eta_{av,chg}$: Average charging efficiency for recent predetermined time $\eta_{av,dch}$: Average discharging efficiency for recent predetermined time $\eta_{eng}$: Engine efficiency In one form of the present disclosure, an operation point with highest system efficiency, that is, an optimal engine operating point and motor operating point may be selected among candidate points based on the above calculated system efficiency. In this case, charging and discharging may be differentiated and, accordingly, system efficiency during charging may be used or system efficiency during discharging may be used.

Referring to Equation 1 above, system efficiency during charging $\eta_{sys,chg}$ may be calculated from engine output $\dot{W}_{eng}$, motor output $\dot{W}_{mot}$, current charging efficiency $\eta_{chg}$, average discharging efficiency for recent predetermined time $\eta_{av,chg}$, and engine efficiency $\eta_{eng}$.

Referring to Equation 2 above, system efficiency during discharging $\eta_{sys,dch}$ may be calculated from engine output $\dot{W}_{eng}$, motor output $\dot{W}_{mot}$ current discharging efficiency $\eta_{dch}$ average charging efficiency for recent predetermined time $\eta_{av,chg}$ and engine efficiency $\eta_{eng}$.

In Equations 1 and 2 above, the sum of the engine output and the motor output may be output according to demand torque, that is, demand output corresponding to demand torque and, accordingly, the demand output may be used instead of the sum of the engine output and the motor output of Equations 1 and 2 above.

FIG. 1 is a flowchart of an operation of determining an optimal operating point according to the present disclosure. The present disclosure will be described below with reference to the drawing.

The operation of FIG. 1 may be performed by a controller in a vehicle, for example, a hybrid control unit (HCU) and, thus, a battery state of charging (hereinafter, referred to as 'SOC') may be first checked.

The battery SOC information may be information provided by a battery management system (BMS).

Then, the controller may compare a current battery SOC with a predetermined SOC upper limit $SOC_{high}$ and a predetermined SOC lower limit $SOC_{low}$ in real time (S11 and S13), enter a charging limit mode when the current battery SOC is equal to or greater than the SOC upper limit $SOC_{high}$ (S12), and enter a discharging limit mode when the current battery SOC is equal to or less than the SOC lower limit $SOC_{low}$ (S12).

The charging limit mode and the discharging limit mode are well known technologies and, thus, a detailed description thereof will be omitted here.

On the other hand, when the current SOC is less than the SOC upper limit $SOC_{high}$ and greater than the SOC lower limit $SOC_{low}$, the optimal operating point is determined according to the operation of determining the optimal operating point of the present disclosure, and after the optimal operating point is determined, an operation of a driving source, that is, an operation of an engine and a motor is controlled such that the determined optimal operating point is used for driving.

Specifically, when demand torque $T_{demand}$ is acquired and an engine torque reference value $T_{OOL}$ that follows the optimal operating line is acquired based on an engine efficiency map (which may be an efficiency map according to engine torque and engine velocity (rpm)) according to engine characteristics of a vehicle, the demand torque $T_{demand}$ and the engine torque reference value $T_{OOL}$ may be checked (S15) and may be compared with each other (S16). In this case, when the demand torque $T_{demand}$ is less than the engine torque reference value $T_{OOL}$, charging mode control may be performed, whereas when the demand torque $T_{demand}$ is greater than the engine torque reference value $T_{OOL}$, discharging mode control may be performed.

Here, in the case of a charging mode in which the demand torque $T_{demand}$ is less than the engine torque reference value $T_{OOL}$, a plurality of engine operating points for driving an engine, which satisfy the demand torque, may be determined from a map of an entire operating region of the engine, motor operating points corresponding to the respective engine operating points may be determined and, then, system efficiency during charging for each candidate point may be calculated according to Equation 1 above based on setting information and efficiency information of the candidate point (S17).

Then, a candidate point with highest system efficiency during charging may be selected among the candidate points and determined as an optimal operating point (S18), engine torque $T_{engine}$ and motor torque (motor regenerative torque) $T_{motor}$, which correspond to the optimal operating point, may be determined and, then, operations of the engine and the motor may be controlled according to the determined engine torque and motor torque.

In this case, the sum of the engine torque $T_{engine}$ and the motor torque (which is motor regenerative torque (charging torque and generation torque) as a negative value) $T_{motor}$ of the determined optimal operating point may be the demand torque $T_{demand}$ and a torque difference between the demand torque and the engine may be used in an operation of generating electricity of a motor to recharge a battery.

When the optimal operating point is acquired, average charging efficiency (moving average) for a previous predetermined time may be newly calculated using charging efficiency in the acquired optimal operating point and, then, an average charging efficiency value may be updated and stored (S18).

On the other hand, in the case of a discharging mode in which the demand torque $T_{demand}$ is greater than the engine torque reference value $T_{OOL}$, a plurality of engine operation points for driving an engine, which satisfy the demand torque, may be determined from a map of an entire operating region of the engine, motor operating points corresponding to the respective engine operating points may be determined and, then, system efficiency during discharging for each candidate point may be calculated according to Equation 2 above based on setting information and efficiency information of the candidate point (S19).

Then, a candidate point with highest system efficiency during discharging may be selected among the candidate points and determined as an optimal operating point, the engine torque $T_{engine}$ and the motor torque $T_{motor}$, which correspond to the optimal operating point, are determined (S20) and, then, operations of the engine and the motor may be controlled so that the determined engine torque and motor torque are output.

In this case, the sum of the engine torque $T_{engine}$ and the motor torque (which is motor driving torque as a positive value) $T_{motor}$ of the determined optimal operating point may be the demand torque and a torque difference between the demand torque and the engine may be compensated using the motor torque.

When the optimal operating point is acquired, discharging average efficiency (moving average) for a previous predetermined time may be newly calculated using discharging efficiency in the optimal operating point and, then, a discharging average efficiency value may be updated and stored (S20).

Tables 1 and 2 below show an example in which system efficiency during charging and system efficiency during discharging are calculated and an optimal operating point is selected among a plurality of candidate points.

TABLE 1

| [Charging] | Demand Torque (a) [Nm] | Demand Torque (b) [KW] | Engine Torque (c) [Nm] | Motor Regenerative Torque (d) [Nm] | Engine Output (e) [kW] | Motor Regenerative Power (f) [kW] | BSFC (g) [g/kWh] | Charging efficiency (h) | Charging power (i)(=f*h) [kW] | Fule Consumption (j)(=e*g) [g/h] |
|---|---|---|---|---|---|---|---|---|---|---|
| [Charging A] | 20 | 3.908 | 75 | 55 | 14.66 | 10.75 | 222.6 | 0.8973 | 9.64 | 3,262.32 |
| Charging B] | | | 80 | 60 | 15.63 | 11.72 | 219.9 | 0.8937 | 10.48 | 3,437.60 |
| [Charging C] | | | 85 | 65 | 16.61 | 12.7 | 218.5 | 0.8896 | 11.3 | 3,629.20 |
| [Charging D] | | | 90 | 70 | 17.59 | 13.68 | 218.5 | 0.8856 | 12.11 | 3,842.68 |

| [Discharging] | Demand Torque (a) [Nm] | Demand Torque (b) [KW] | Engine Torque (c) [Nm] | Motor Driving Torque (d) [Nm] | Engine Output (e) [kW] | Motor Driving Power (f) [kW] | BSFC (g) [g/kWh] | Discharging (h) efficiency | Discharging power (i)(=f*h) [kW] | Fule Consumption (j)(=e*g) [g/h] |
|---|---|---|---|---|---|---|---|---|---|---|
| [Discharging A] | 145 | 44.035 | 105 | 40 | 31.89 | 12.15 | 218.8 | 0.902 | 13.47 | 6,976.91 |
| [Discharging B] | | | 110 | 35 | 33.41 | 10.63 | 219.5 | 0.9059 | 11.73 | 7,332.53 |
| [Discharging C] | | | 115 | 30 | 34.92 | 9.11 | 220.5 | 0.9098 | 10.01 | 7,700.75 |
| [Discharging D] | | | 120 | 25 | 36.44 | 7.59 | 222.5 | 0.9083 | 8.36 | 8,108.45 |

TABLE 2

| Division | Average Discharging Efficiency (k) | Single System Efficiency (m) [m = [(b + i)*3600]/(j*44.4*)] | Complex System Efficiency (n) [n = {(b + i + k)*3600}/(j*44.4)] | Remarks |
|---|---|---|---|---|
| Charging A | 0.9 | 0.3368 | 0.3128 | |
| Charging B | | 0.3393 | 0.3146 | Optimal operating point according to the present disclosure (based on complex system efficiency) |
| Charging C | | 0.3398 | 0.3145 | Conventional optimal operating point (based on single system efficiency) |
| Charging D | | 0.3381 | 0.3125 | |

| Division | Average Charging Efficiency (k) | Single System Efficiency (m) [m = (b*3600)/{(e + i)*g*44.4] | Complex System Efficiency (n) [n = (b*3600)/{(e + i/k)*g*44.4] | Remarks |
|---|---|---|---|---|
| Discharging A | 0.9 | 0.3598 | 0.3483 | |
| Discharging B | | 0.3604 | 0.3502 | Conventional Optimal operating point (based on single system efficiency) |
| Discharging C | | 0.3603 | 0.3516 | Optimal operating point according to the present disclosure (based on complex system efficiency) |
| Discharging D | | 0.3582 | 0.3509 | |

Although the number of candidate points is 4 for each of charging and discharging in Tables 1 and 2 above, this is merely an example obtained simply by reducing the number of candidate points in order to clarify the description of the present disclosure and, thus, the number of candidate points may be changed in various ways in reality and actual candidate points may be determined with a larger number compared with examples in Tables 1 and 2 above.

Tables 1 and 2 above show an example of four candidate points (Charging A to Charging D and Discharging A to Discharging D), which satisfy demand torque "a" based on operating points with low engine BSFC, have a difference of 5 Nm in engine torque "c", and are extracted from an engine efficiency map.

At each candidate point (Charging A to Charging D and Discharging A to Discharging D) of Tables 1 and 2 above, the demand torque "a" may be the sum of engine torque "c" (Nm) and motor torque "d" (motor regenerative torque during charging and motor driving torque during discharging) (Nm), motor torque during charging may be motor regenerative torque as a negative value (a minus symbol "−" is omitted in the tables), and motor torque during discharging may be motor driving torque as a positive value (+).

In Equations 1 and 2 above, the sum of engine output "e" (kW) and motor output "f" (kW) is output according to demand torque, that is, demand output (kW) corresponding to the demand torque and, accordingly, the sum of the engine output and the motor output of Equations 1 and 2 above may be replaced with demand output.

Motor output during charging of each candidate point may be motor regenerative power as a negative value (a minus symbol "−" is omitted in the tables), and motor output during discharging may be motor driving power "f" as a positive value (+).

In this case, charging power (kW) may be calculated by multiplying motor regenerative power "f" as motor output during charging by current charging efficiency "h" and discharging power (kW) may be calculated by dividing motor driving power "f" as motor output during discharging by current discharging efficiency "h".

In Tables 1 and 2 above, fuel consumption "j" (g/h) may be calculated by multiplying engine output "e" and brake specific fuel consumption (BSFC) "g" (g/kWh).

In the example of Table 2 above, average efficiency "k" during charging and discharging during previous driving, that is, average discharging efficiency and average charging efficiency are assumed to be 0.9 each.

In Table 2 above, as in a conventional case, system efficiency acquired using only charging efficiency during charging and only discharging efficiency during discharging is defined as "single system efficiency" and, according to the present disclosure, system efficiency acquired using charging efficiency and average discharging efficiency during charging and using discharging efficiency and average charging efficiency during discharging is defined as "complex system efficiency".

As seen from Table 2 above, in a conventional case, [Charging C] with highest single system efficiency during charging and [Discharging B] with highest single system efficiency during discharging are determined as an optimal operating point.

On the other hand, according to the present disclosure, [Charging B] with highest complex system efficiency during charging and [Discharging C] with highest complex system efficiency during discharging are determined as an optimal operating point.

As such, when the single system efficiency and the complex system efficiency are applied, an optimal operating point is differently determined under the same conditions. In this regard, fuel efficiency and a battery usage amount are checked and compared during actual vehicle driving with respect to the case in which an optimal operating point determination method according to the present disclosure is applied and the case in which a conventional optimal operating point determination method is applied. In this case, it is seen that fuel efficiency according to the present disclosure is increased and battery usage amount is reduced, compared with the conventional case.

Battery charging/discharging current amplitude may also be reduced and, thus, the reduction in battery usage amount and the reduction in battery charging/discharging current amplitude may greatly contribute to extension of a lifetime of a battery.

Accordingly, in the optimal operating point determination method of a hybrid electric vehicle according to the present disclosure, system efficiency may be calculated using both charging efficiency and discharging efficiency during charging and discharging so as to determine an optimal operating point in which actual charging and discharging situations are more accurately reflected compared with a conventional case, thereby contributing to improved vehicle fuel efficiency.

Reduction in charging efficiency and reduction in discharging efficiency are simultaneously considered and, thus, use of load of all power electronic (PE) components may be decreased, thereby reducing a battery usage amount and extending a battery lifetime.

In addition, charging and discharging efficiency (average charging and discharging efficiency) in consideration of driver characteristics may be estimated and reflected in calculation of system efficiency so as to determine an optimal operating point personalized to driver characteristics.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of determining an optimal operating point of a hybrid electric vehicle, the method comprising:
    determining, by a controller, a demand torque of a driver by collecting vehicle driving information from an acceleration pedal sensor (APS), a brake pedal sensor (BPS), and vehicle state information including a gear stage, a vehicle speed, an engine velocity (rpm), a battery state of charge (SOC);
    comparing, by the controller, the demand torque and an engine torque reference value obtained from an optimal operating line to determine a determined mode, wherein the determined mode is a charging mode or a discharging mode;
    determining, by the controller, a plurality of candidate points in the determined mode, wherein each candidate point comprises a combination of an engine operating point satisfying the demand torque and a motor operating point corresponding to the engine operating point;
    when the determined mode is a charging mode, calculating, by the controller, a system efficiency during charging based on a charging efficiency of each candidate point of the plurality of candidate points and an average discharging efficiency during previous driving;
    when the determined mode is a discharging mode, calculating, by the controller, a system efficiency during discharging based on an average discharging efficiency of each candidate point of the plurality of candidate points and an average charging efficiency during previous driving;
    determining, by the controller, the optimal operating point, wherein the optimal operating point is the candidate point with the highest system efficiency during charging or discharging; and
    controlling, by the controller, an operation of the engine and a motor based on the determined optimal operating point.

2. The method of claim 1, wherein the system efficiency during discharging is based on an engine output and a motor output of each candidate point of the plurality of candidate points, a discharging efficiency, the charging efficiency during previous driving, and an engine efficiency.

3. The method of claim 2, wherein the system efficiency during discharging is acquired according to Equation 2 below:

$$\eta_{sys,dch} = \frac{\dot{W}_{eng} + \dot{W}_{mot}}{\dot{W}_{eng} + \frac{\dot{W}_{mot}}{\eta_{av,chg}\eta_{dch}}} \eta_{eng}, \qquad \text{Equation 2}$$

wherein $\eta_{sys,dch}$ is the system efficiency during discharging, $\dot{W}_{eng}$ is the engine output, $\dot{W}_{mot}$ is the motor output, $\eta_{dch}$ is the discharging efficiency, $\eta_{av,chg}$ is the charging efficiency during previous driving, and $\eta_{eng}$ is the engine efficiency.

4. The method of claim 1, wherein the average charging efficiency is obtained by averaging efficiencies during charging for a recent predetermined amount of time.

5. The method of claim 1, wherein the system efficiency during discharging is acquired based on a demand output, the engine output and the motor output of each candidate point of the plurality of candidate points, the discharging efficiency, the charging efficiency during previous driving, and the engine efficiency, wherein the demand output is calculated from the demand torque.

6. The method of claim 1, wherein the system efficiency during charging is acquired based on the engine output and the motor output of each candidate point of the plurality of candidate points, a charging efficiency, the discharging efficiency during previous driving, and the engine efficiency.

7. The method of claim 6, wherein the system efficiency during charging is acquired according to Equation 1 below:

$$\eta_{sys,chg} = \frac{\dot{W}_{eng} + \dot{W}_{mot} - \dot{W}_{mot}\eta_{chg}\eta_{av,dch}}{\dot{W}_{eng}}\eta_{eng}, \quad \text{Equation 1}$$

wherein $\eta_{sys,chg}$ is the system efficiency during charging, $\dot{W}_{eng}$ is the engine output, $\dot{W}_{mot}$ is the motor output, $\eta_{chg}$ is the discharging efficiency, $\eta_{av,dch}$ is the charging efficiency during previous driving, and $\eta_{eng}$ is the engine efficiency.

8. The method of claim 1, wherein the system efficiency during charging is acquired based on the demand output, the engine output and the motor output of each candidate point of the plurality of candidate points, the charging efficiency, the discharging efficiency during previous driving, and the engine efficiency, wherein the demand output is calculated from the demand torque.

9. The method of claim 1, wherein the average discharging efficiency is obtained by averaging efficiencies during discharging for a recent predetermined amount of time.

* * * * *